June 9, 1931.  I. A. WEAVER  1,809,431
VALVE CONSTRUCTION
Filed Oct. 5, 1928   2 Sheets-Sheet 2
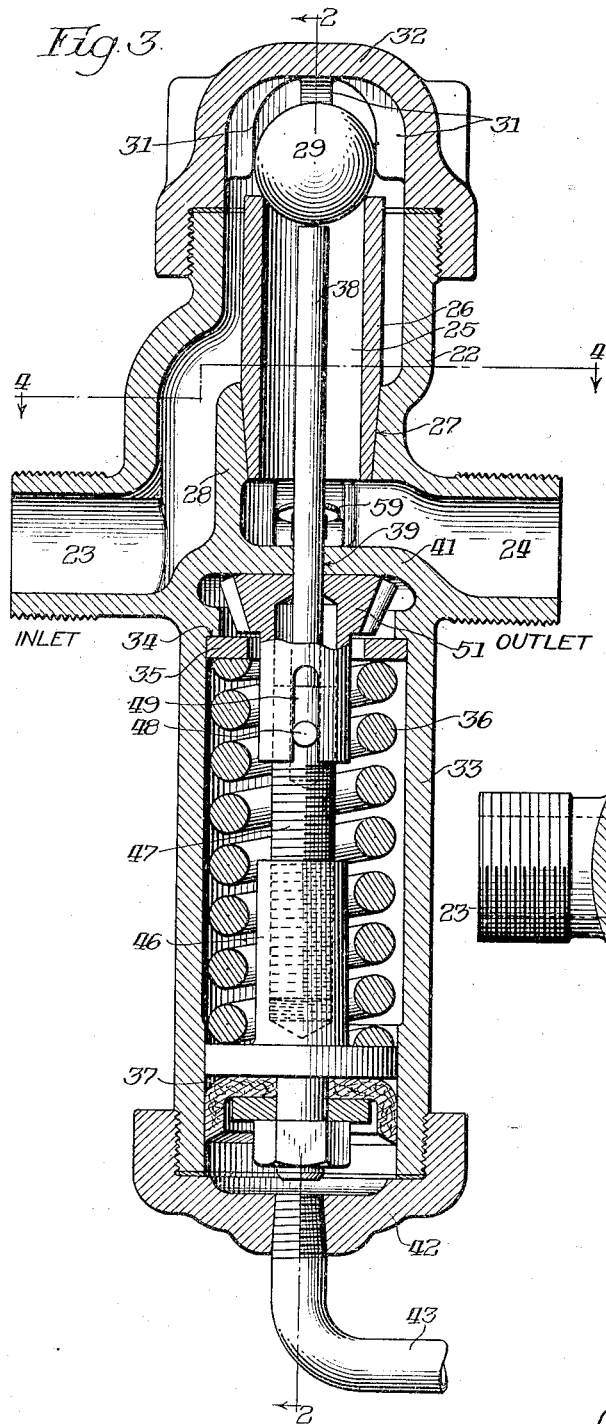
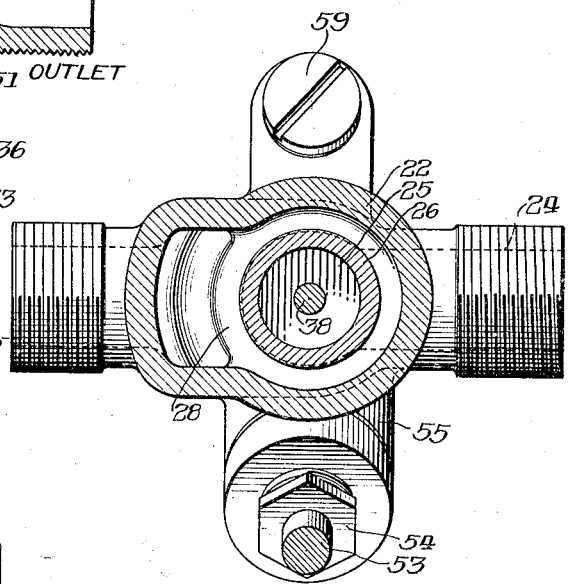
Inventor
Ira A. Weaver
By Walter M. Fuller
Atty.

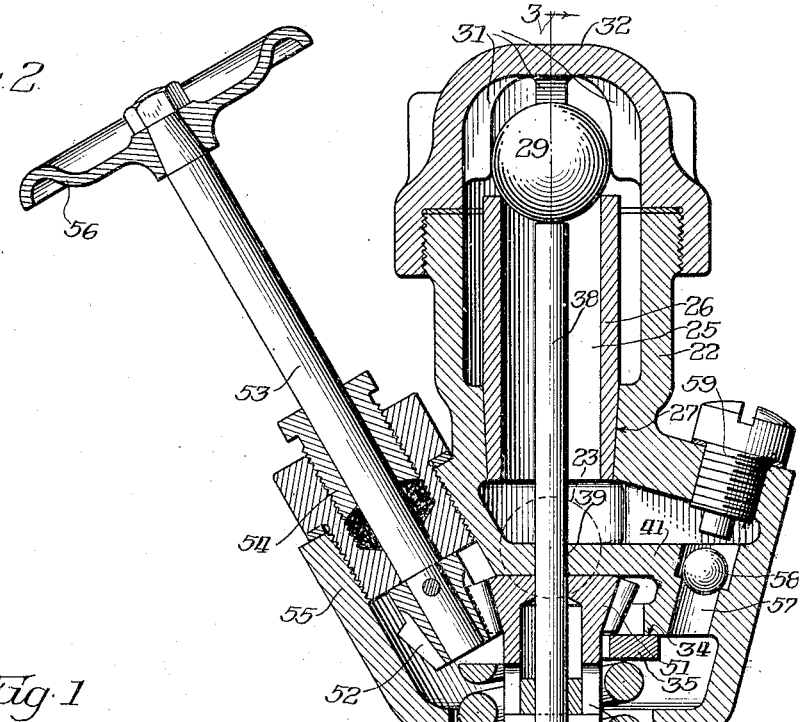
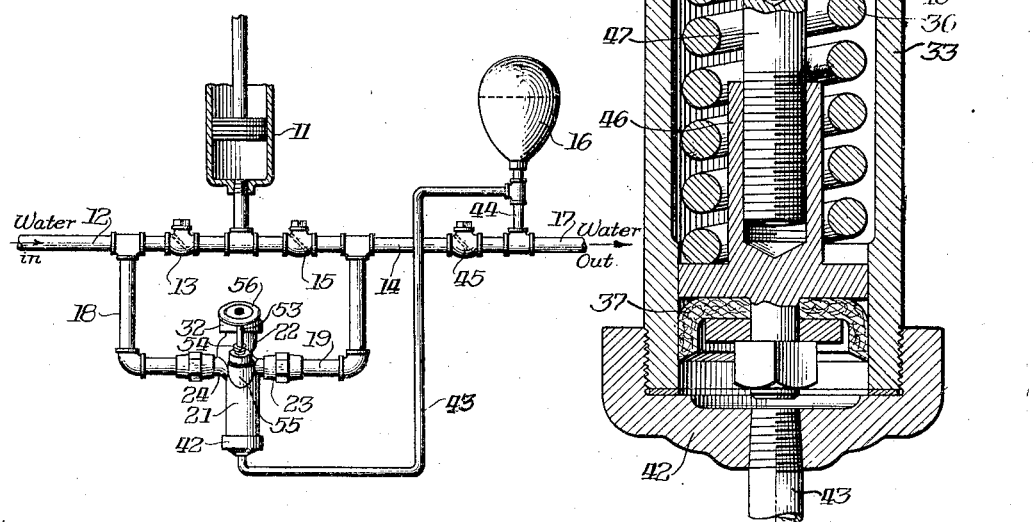

Patented June 9, 1931

1,809,431

UNITED STATES PATENT OFFICE

IRA A. WEAVER, OF SPRINGFIELD, ILLINOIS, ASSIGNOR TO WEAVER MANUFACTURING COMPANY, OF SPRINGFIELD, ILLINOIS, A CORPORATION OF ILLINOIS

VALVE CONSTRUCTION

Application filed October 5, 1928. Serial No. 310,494.

My invention pertains to a valve mechanism adapted for use in association with a pump supplying liquid or fluid under pressure, for example, furnishing water to an appropriate nozzle, as for use in washing vehicles, whereby to relieve or reduce the load on the means operating the pump when the full capacity of the latter is not required, as by opening a by-pass around the pump, as occasion requires, to lessen the pump load.

In those instances where the pump is actuated by an electric motor, the amount of electricity or power consumed by the latter may be economically substantially diminished by the employment of my improved controlling or regulating means.

Stated somewhat otherwise, my novel system and appliance in a car-washing device, where it is especially adapted for use, causes the power consumed by the motor operating the pump to be practically only that required to supply the nozzle with water of the volume and pressure actually being used at such nozzle.

One of the leading aims and objects of the invention is the production or provision of a so-called unloading valve of the general character stated which is simple in construction, economical to manufacture, and effective in service.

To the accomplishment of these and other desirable aims and purposes, I have devised the valve mechanism illustrated in the accompanying drawings, and which represents a present, preferred embodiment of the invention, these drawings forming a part of this specification, and, throughout their several views, like reference numerals have been used to designate the same structural parts.

In these drawings,—

Fig. 1 is a diagrammatic view of the improved valve mechanism shown in association or co-operation with a pump;

Fig. 2 is a longitudinal or vertical, central section through the improved valve, on line 2—2 of Fig. 3;

Fig. 3 is a longitudinal section through the center of the valve mechanism, on line 3—3 of Fig. 2; and Fig. 4 is a horizontal cross-section on line 4—4 of Fig. 3.

Having resort to these drawings, it will be observed that the pump 11 receives its water, or other liquid or fluid, from the inlet or admission pipe 12 connected, for example, to any suitable source of water supply and equipped with an appropriate pump-inlet check-valve 13, such pump discharging the water, under suitable pressure, to a pipe 14 fitted with the customary pump check-valve 15 and to a pressure-regulator 16, such as a closed vessel, the upper portion of which is partially filled with air, the water being delivered to a pipe 17 connected to a control nozzle, not shown, or to any other means to which such water under pressure may be fed.

Around the pump and its two associated check-valves, I provide a by-pass conduit or pipe 18, 19 in which the valve 21, constituting more particularly the subject-matter of the present invention, is incorporated or inserted.

Such valve comprises a casing or housing 22 having an inlet opening 23 joined to pipe 19, and having an outlet or discharge opening 24 connected to the companion pipe 18, whereby it will be apparent that, if the passage or conduit between said openings is completely closed, the pump will operate at full capacity because the by-pass is then closed, whereas, if such passage is opened, more or less of the load on the pump will be correspondingly lessened because some or all of the water pumped can and will pass idly and readily through such by-pass.

The upright passage 25, connecting such admission and discharge openings, is formed by a vertical tube or pipe 26 suitably mounted at its lower end in a tapered aperture 27 in a division wall 28 which separates such inlet and delivery openings, the upper end of such conduit 26 constituting a valve-seat and being equipped with a ball-valve 29 capable of up and down movement and guided in such travel by ribs 31 on the inside of a cap 32 demountably screwed on to the top of the valve-casing.

The lower, hollow, cylindrical part 33 of the casing has an internal, circular shoulder 34 against which an abutment washer or collar 35 bears, and, below such element and pressing against it, is a coiled spring 36, the lower end of which bears on a piston or plunger 37 fitted with the usual cup, leather washer, reciprocatory in the cylinder, such piston having a rod 38 slidable through a bearing 39 in a division wall 41 of the casing which separates the space in the cylindrical section 33 from the upper portion of the casing equipped with the admission and discharge ports, the upper end of such rod being below the center of the ball-valve 29 and permitting the latter to seat when the piston is at the lower end of its stroke, as shown in Fig. 2.

A screw-threaded cap or cover 42 closes the lower end of the cylinder 33, and an aperture through it is connected by a pipe 43 to the pipe 44, which joins the pressure-equalizer 16 to the delivery pipe 17, whereby the water pressure in the air-cushion chamber 16 and in the associated pipe 17, which is provided with a check-valve 45 on the side of the equalizer toward the pump, is imposed on the under surface of the sliding piston 37.

When the water delivery through the pipe 17 is practically free and open, as when the valve of the nozzle associated therewith is fully open, there is insufficient pressure below the piston to raise it or force it up against the action of spring 36, with the result that the ball-valve 29 remains closed and no water flows through the by-pass, all of it being delivered directly to pipe 17 and its nozzle.

When, however, a greater water pressure is developed in pipe 17 and the equalizer, because less water is being consumed than the pump is attempting to force through the pipe, the piston is forced up by such excessive pressure, transmitted to its cylinder through the pipe 43, against the action of the spring, and the piston rod or pin 38 raises or opens the ball-valve, allowing the water to flow more or less freely through the by-pass, thus in a measurable degree taking the unnecessary load off of the pump and relieving its operating motor in like measure, with a marked economic saving of power used to operate the pump under these circumstances.

In order to adjust the pressure at which the ball-valve will open, the following-specified, co-operating instrumentalities have been provided:

The hub 46 of the piston 37 is internally screw-threaded to receive a portion of a partially-threaded rod 47 having a cross-pin 48, the protruding ends of which fit in longitudinal slots 49 in the hub of a gear 51 centrally apertured to permit the rod 38, which forms a part of, or is fixedly mounted on, the threaded rod 47, to slide through it.

As is clearly shown, the unthreaded, upper section of the member 47 and the rod or pin 38 afford a suitable bearing for the gear 51.

The teeth of such gear 51 are in mesh with those of another gear 52 fixed on a rod or shaft 53 extended out through a stuffing-box or gland-packing 54 mounted in a lateral extension 55 of the valve-casing, the exposed part of the rod or shaft 53 having an operating handle 56 by which it may be readily revolved to turn gear 51 and rod 47, whereby to screw the latter more or less into or out of the piston-hub 46, thus shortening or elongating the distance between the piston and the upper end of rod 38, it being apparent that, the further the latter is from the valve 29, when the piston is at its lowermost position, the greater the water pressure required to compress the spring 36 before the valve is raised from its seat.

Hence, by turning the handle, the pressure needed to open the by-pass valve may be easily and quickly adjusted or regulated.

It should be noted that, when the valve 29 is closed, it is held securely to its seat by reason of the pump pressure of the water on its top surface, it being obvious that the passage or port 23 is connected to the outlet end of the pump beyond its discharge valve 15, and, when such by-pass ball-valve is open, the water flowing through its port passes back to the inlet side of the pump through the port 24 and pipe 18, thus relieving the pump in substantial degree or amount of the load imposed on it, hence automatically reducing the power consumption necessary to actuate the pump.

As soon as the pressure below the piston is adequate to start the opening of the valve against the opposing liquid pressure above it, the valve quickly opens fully and completely by reason of the instant reduction or release of such obstructing or resisting pressure due to the initial opening of the valve, so that there is no substantial wire-drawing action or effect, inasmuch as the valve is either wholly open or entirely closed.

When the valve of the nozzle is quickly or abruptly closed, the piston or plunger must rise with corresponding rapidity to unload the pump by opening the by-pass conduit around it, and, such ascent of the piston must displace the water which may accumulate in or flow into the spring chamber above it.

Accordingly, the division or partition wall 41 is supplied with a port 57 through it, connecting such spring compartment with the delivery port 24, the port 57 being supplied with an upwardly-opening, ball check-valve 58, accessible by means of a screw 59 threaded through an opening in the valve-casing and acting also as a stop to limit the rise of the valve.

Clearly, such valve will readily open upwardly to discharge any water in the spring chamber, and will also automatically close whenever permitted to do so by the pressure conditions operating on it.

One object of using the auxiliary ball-valve is to prevent the rush of water, when the main ball-valve is instantly opened, from reaching the upper side of the piston and tending to set up an objectionable vibration.

It will be understood that, by using the check-valve 45 between the air-chamber pressure-equalizer and the inlet pipe 19 leading to the enlarged valve 29, the pressure in the air-chamber will be preserved and sustained when the by-pass conduit is open, thus not permitting the loss of a pressure condition built up by reason of the automatic opening of the by-pass conduit controlled by the presence of such pressure.

The valve mechanism described is not necessarily limited to the particular employment indicated, nor is its construction restricted precisely to that presented, since many more or less radical modifications may be incorporated in the apparatus without departing from the essence of the invention as defined by the following claims, and without the sacrifice of any of the advantages accruing from the employment of the invention.

I claim:

1. In a valve, the combination of a valve-casing having inlet and discharge ports, a valve controlling the passage connecting said ports, a piston slidable in a cylindrical part of said casing, a rod having a screw-threaded connection with said piston and adapted to open said valve upon movement of said piston, a spring opposing the valve-opening travel of said piston, means to apply fluid pressure to said piston in opposition to the action of said spring thereon, a gear in said casing having a sliding connection with said rod permitting the gear to turn said rod to change its effective length with relation to said piston, a second gear in said casing in mesh with said first gear, and means projecting outside of said casing by which said second gear may be turned to adjust the fluid pressure on said piston at which the latter will unseat said valve.

2. In a valve, the combination of a valve-casing having inlet and discharge ports, a valve controlling the passage in said casing connecting said ports, a piston slidable in a cylindrical part of said casing, means actuated by the movement of said piston to open said valve, a spring in said casing opposing the valve-opening movement of said piston, means to apply fluid pressure to said piston in opposition to the action of said spring thereon, said casing having a ported wall separating the chamber thereof housing said spring from said passage, and a check-valve governing said wall port to open the same upon the development of an excessive fluid pressure in said spring chamber.

3. In a valve, the combination of a valve casing having inlet and discharge ports, a valve controlling the passage connecting said ports, a piston slidable in a cylindrical part of said casing, a rod having a screw threaded connection with said piston and adapted to open said valve upon movement of said piston, a spring opposing the valve opening travel of said piston, means to apply fluid pressure to said piston in opposition to the action of said spring thereon, a gear in said casing on the rod centrally apertured to permit the rod to slide through it and the rod forming a bearing for the gear, the hub of said gear having a longitudinal slot, a projection on the rod engaging said slot, said projection and slot forming a connection between the gear and rod providing for turning the rod by the gear while permitting movement of the rod longitudinally through the gear to change its effective length with relation to said piston, a second gear in said casing in mesh with said first gear, and means projecting outside of said casing by which said second gear may be turned to adjust the fluid pressure on said piston at which the latter will unseat the valve.

In witness whereof I have hereunto set my hand.

IRA A. WEAVER.